(No Model.) 4 Sheets—Sheet 1.

C. S. BROWN & W. E. PENN.
MILK WEIGHING AND DISCHARGING MACHINE.

No. 565,721. Patented Aug. 11, 1896.

Witnesses. Inventors.
Anna V. Faust. Charles S. Brown
John F. LaBoule William E. Penn
By Benedict Morsell
Attorneys.

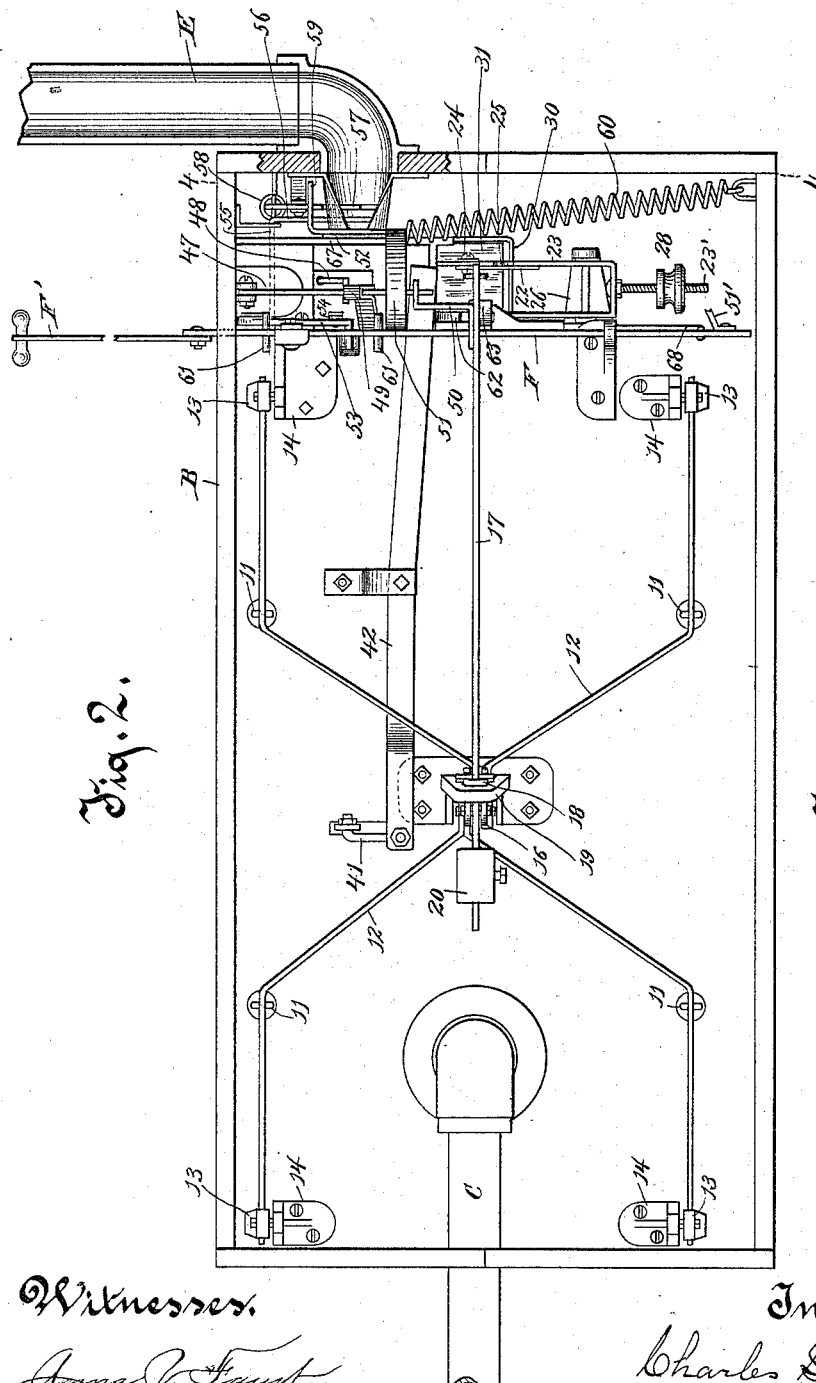

(No Model.) 4 Sheets—Sheet 3.

C. S. BROWN & W. E. PENN.
MILK WEIGHING AND DISCHARGING MACHINE.

No. 565,721. Patented Aug. 11, 1896.

Witnesses
Anna V. Faust
John F. LaBoule

Inventors
Charles S. Brown
William E. Penn
By Benedict Morsell
Attorneys.

(No Model.) 4 Sheets—Sheet 4.

C. S. BROWN & W. E. PENN.
MILK WEIGHING AND DISCHARGING MACHINE.

No. 565,721. Patented Aug. 11, 1896.

Witnesses.
Anna V. Faust.
John F. LaBoule

Inventors.
Charles S. Brown
William E. Penn
By Benedict & Morsell
Attorneys.

THE NORRIS PETERS CO., PHOTO-LITHO., WASHINGTON, D. C.

UNITED STATES PATENT OFFICE.

CHARLES S. BROWN AND WILLIAM E. PENN, OF LAKE MILLS, WISCONSIN, ASSIGNORS TO THE F. B. FARGO & COMPANY, OF SAME PLACE.

MILK WEIGHING AND DISCHARGING MACHINE.

SPECIFICATION forming part of Letters Patent No. 565,721, dated August 11, 1896.

Application filed October 24, 1895. Serial No. 566,689. (No model.)

*To all whom it may concern:*

Be it known that we, CHARLES S. BROWN and WILLIAM E. PENN, of Lake Mills, in the county of Jefferson and State of Wisconsin, have invented a new and useful Improvement in Milk Weighing and Discharging Machines, of which the following is a description, reference being had to the accompanying drawings, which are a part of this specification.

In agricultural districts, and especially where dairying is carried on extensively, it is common to have a creamery, to which farmers and dairymen bring fresh new milk to have the butter removed therefrom by well-known processes. It is also common at the creamery to return to the farmer or dairyman an amount of skimmed milk corresponding with the amount of fresh milk brought to the creamery. It has been a matter of considerable annoyance and difficulty to ascertain and deliver to each person so bringing milk to the creamery his due proportion of skimmed milk.

The object of our invention is to provide a measuring or weighing machine adapted to measure or weigh the skimmed milk that is to be delivered to the person entitled thereto and also to make this weighing or measuring machine automatic, so that the person having the proper weights or proper representative devices can himself withdraw and secure his due amount of the skimmed milk.

The invention consists of the machine or apparatus and its various parts and combinations of parts, as hereinafter described and claimed, or their equivalents.

Figure 1:
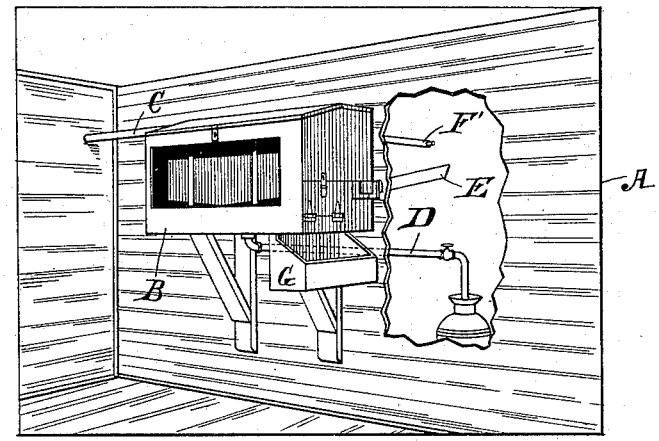
Figure 4:
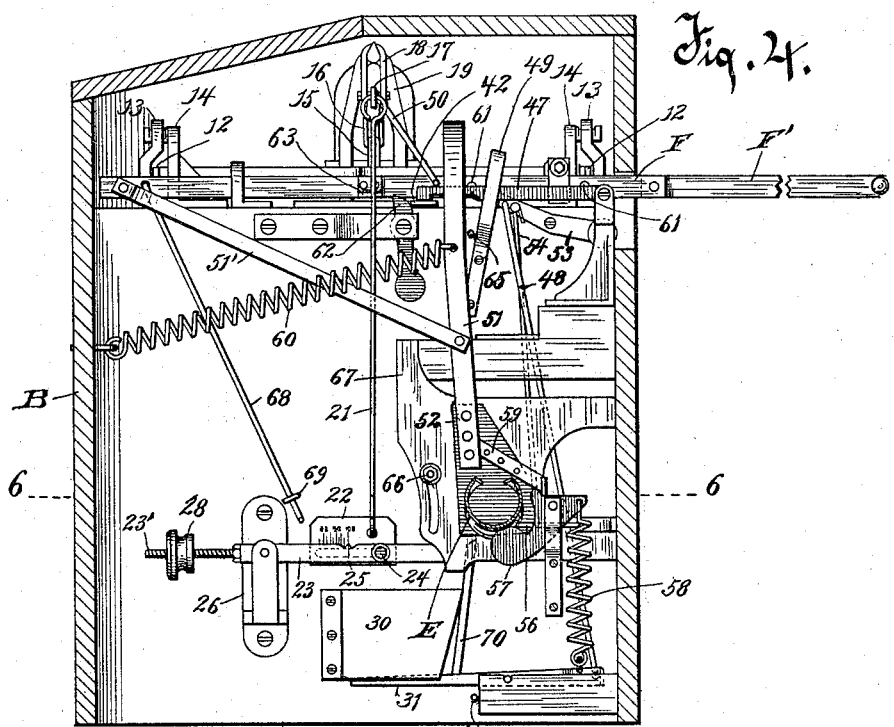
Figure 3:
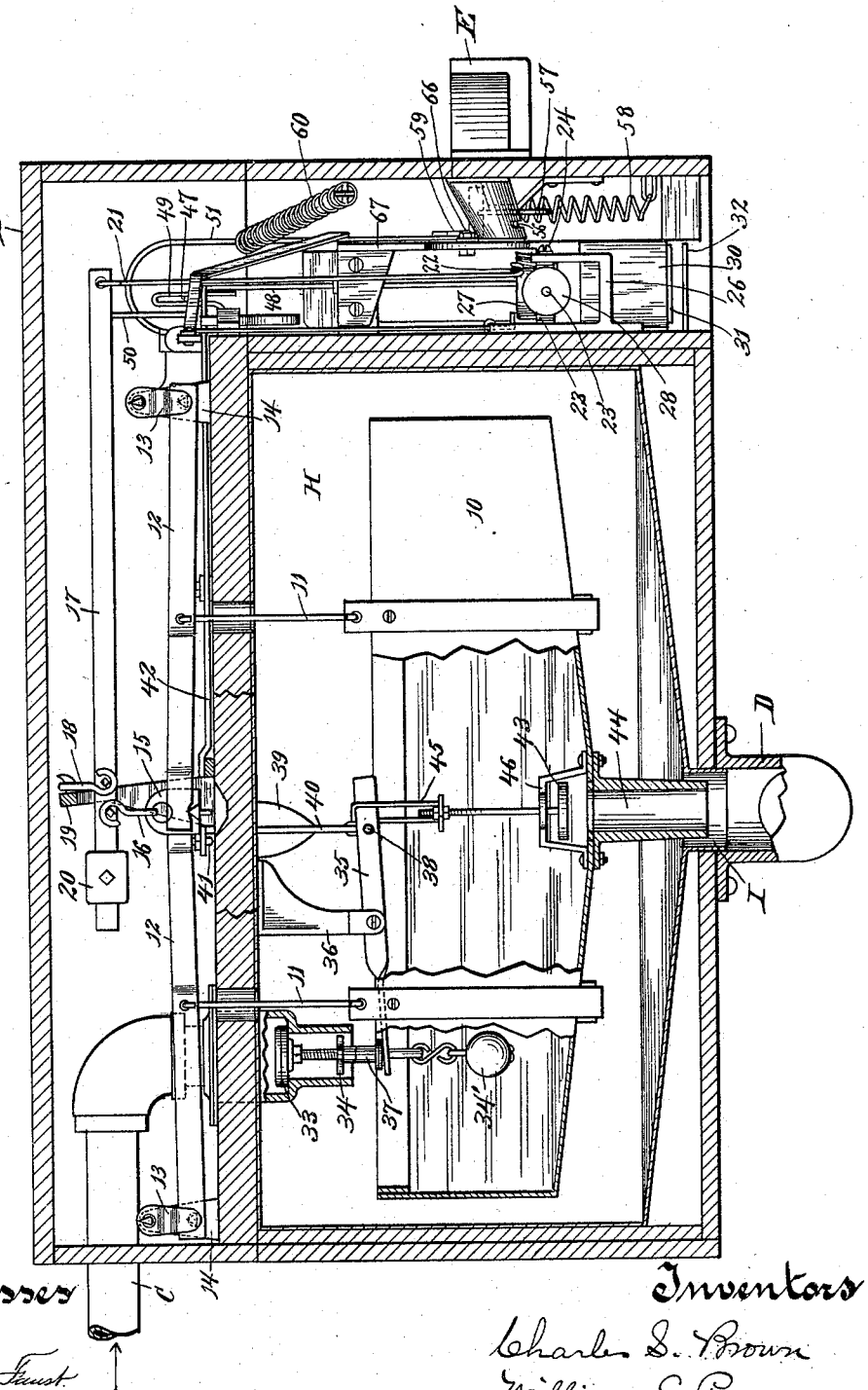
Figure 5:
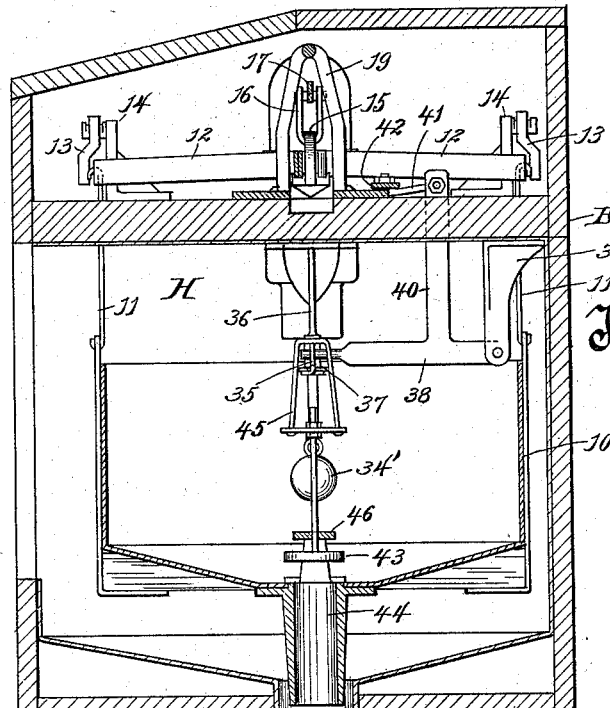
Figure 8:
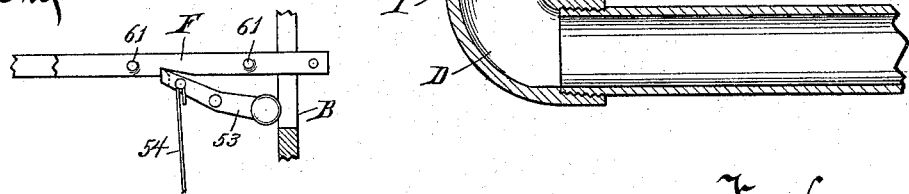
Figure 6:
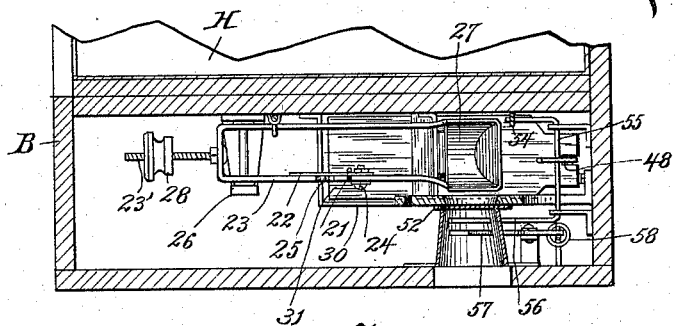
Figure 7:
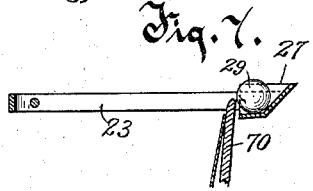

In the drawings, Figure 1 is a general perspective view of our improved machine put up on the wall of a creamery to illustrate the manner of its use, the wall of the creamery being broken away to illustrate exterior portions and connections. Fig. 2 is a top plan view of the machine, the top or cover of the case being removed to show the interior construction and a portion of the side wall of the case being also broken away to further expose parts of the apparatus. Fig. 3 is a vertical longitudinal section of the machine, parts being broken away, exhibiting portions in different vertical planes. Fig. 4 is a transverse section on line 4 4 of Fig. 2 looking inwardly toward the left of Fig. 2. Fig. 5 is a transverse vertical section medially and nearly centrally of Fig. 3. Fig. 6 is a horizontal section, on line 6 6 of Fig. 4, of a portion of the mechanism located at the right in Figs. 2 and 3. Fig. 7 is a detail in section of a ball or weight holding and controlling device. Fig. 8 is a detail of a locking device for a handle or draw-bar. Fig. 9 illustrates two balls or representative weights used with the machine.

In the drawings, A is the wall of a creamery or building. Our machine is adapted to be located inside the building and on or near the wall thereof.

B is the case of our machine and is shown in Fig. 1 as being supported by suitable cleats or brackets on the wall A. A pipe C leads from the supply of skimmed milk into the case, and another pipe D leads therefrom through the wall of the building to the place of milk discharge. A trough or runway E for the weight-balls also runs from a point outside of the building into the case B. A handle or draw-bar F projects through the side of the case and through the wall A and is accessible outside of the building.

It will be observed that the pipe D discharges outside of the building, that the runway E leads from outside the building into the case of the machine, and that the handle or draw-bar F also extends through the wall of the building. Other than as to these three features, the discharge-pipe D, the weight-runway E, and the draw-bar F, no portion of the machine is accessible to any person outside of the building, nor, in fact, when the sides and top of the case are closed and locked, can any person get access to the operative parts of the machine or meddle with it.

A box G is provided to catch the weight-balls as they are discharged from the machine after having served their purpose therein.

Portions of the top and side and the end of the case are secured releasably to other parts of the case, so as to provide means for access to the operative parts of the mechanism within, for repairs or otherwise.

Within the case B there is a chamber H, occupying the larger part of the lower portion of the case and extending from one end of the case nearly to the other end thereof. This chamber is preferably lined with zinc, and and that portion of it below the edge of the door seen in Fig. 1 is preferably made liquid-tight, Figs. 3 and 5, so as to be capable of receiving and holding a certain amount of overflow or backset from the discharge-pipe. The discharge-pipe D leads from the floor or discharge-orifice I of this chamber H. The eduction-pipe C leads through the case and through the top of the chamber H and discharges downwardly therein into the milk-weighing tank 10.

Tank 10 is preferably made of galvanized iron, and is suspended freely in the chamber H by means of the rods 11 11, connected loosely to the levers 12 12 medially, which levers at their outer extremities are suspended by means of links or hangers 13 13 and with knife-edge fulcrums on posts or brackets 14 14, fixed on the top of the chamber H. At their adjacent and overlapping inner ends these levers 12 12 are supported by means of a block 15 having knife-edge fulcrums and a link 16 and by means of other knife-edge fulcrums on one arm of the steelyard 17, which steelyard is suspended and fulcrumed on a link 18, which link is suspended on a yoke-bracket 19 straddling the steelyard and the inner ends of the levers 12 12 and footed and fixed on the top of the chamber H. A counterpoise 20, adjustable on the short arm of the steelyard 17, is adapted to assist in the adjustment of the mechanism. The extremity of the long arm of the steelyard 17 is connected by a rod 21 to a graduated plate 22, secured adjustably to and along the lever-arm 23 by means of a clamping-screw 24, passing through the lever-arm and through an elongated slot in the plate. The arm 23 is provided with an index-point 25, to which the plate 22 may be adjusted by the figures and graduating-marks thereon. The lever-arm 23 is preferably furcate and is pivoted in a bracket 26, fixed on the side of the chamber H. At the extremity of its long arm the lever 23 is provided with a scoop or weight-pocket 27, and its short arm is provided with a screw-threaded extension-arm 23', on which a screw-threaded counterpoise 28 is adjustable.

The graduated plate 22 is adjusted to the index-point 25 on the arm 23 with reference to figures and graduating-marks thereon, so as to adapt the mechanism for balancing at an equilibrium or at "100," or, if desired, at any proportion or per cent. of one hundred, as at "90" or "80," or any intermediate number, so that the weight introduced into the scoop or weight-pocket 27 will be lifted either by one hundred pounds of milk in the tank 10 or by a proportion or per cent. thereof, as determined by the attendant in the creamery. The object of this is that, as a certain amount of the new fresh milk delivered by the farmer or dairyman is cream that is removed for making butter in the creamery, a less amount or a certain proportion or per cent. of the milk only can be returned to the farmer or dairyman as skimmed milk. This amount varies at different seasons of the year, and also with different seasons in which the feed being more or less abundant affects the supply and quality of milk furnished by any particular herd of cows. The quantity of skimmed milk that can be returned to the farmer or dairyman is therefore likely to be less or more at different times, and the adjustment of this part of the machine must be made correspondingly.

Ball-weights 29, Fig. 9, having numbers thereon to correspond with the number of pounds of milk delivered to the creamery by the farmer or dairyman, are delivered to him when he delivers the fresh milk to the creamery, and these being placed in the runway E, run one at a time into the scoop or weight-pocket 27 and depress the weight-beam or lever-arm 23, and thereby elevate and support the tank 10 until it is supplied with a corresponding amount of milk, when the tank goes down by gravity and elevates the pocket 27, discharging the ball-weight therefrom into the hopper 30 and onto the medially-pivoted and tilting bottom 31 of this hopper, which is thereby tilted and permits the weight to escape downwardly from the hopper. A pin 32, inserted in the outer wall of the chamber H beneath the tilting bottom 31, prevents its undue depression.

For the purpose of supplying the tank 10 with skimmed milk a gravity-actuated valve 33 is provided in the pipe C. This valve has a downwardly-extending screw-threaded stem with a screw-threaded adjustable collar 34 turning thereon, the valve-stem being loaded with a weight 34' to bring it surely and firmly to its seat. A lever 35, pivoted medially on a hanger 36, fixed to the under surface of the top of the chamber H, is furcate at one extremity of one arm of the lever and straddles the stem of the valve 33, bearing upwardly against a sleeve or washer 37 on the stem of the valve, and near the extremity of the other arm of the lever one extremity of a swinging arm 38 is inserted loosely in an aperture in the lever 35 therefor, which arm 38 is pivoted at its other extremity in a hanger 39, fixed to the top of the chamber H. This arm 38 is provided with an upwardly-projecting rigid finger 40, which extends movably through the top of the chamber H in a slot therefor, and is connected by a link 41 to one arm of a lever 42, pivoted medially on the upper surface of the chamber H.

A gravity-actuated valve 43 is suspended on one arm of the lever 35 and is adapted to close the discharge nozzle or port 44 in the bottom of the tank 10. The stem of the valve 43 is made adjustable by forming it of two parts, one of which is screw-threaded and turns into a nut, which is secured to the extremities of the yoke 45, together forming the stem of the valve. The stem of the valve moves through a guide 46, fixed in the tank 10 above the discharge port or nozzle 44. The nozzle 44 enters the orifice I, but so loosely as to provide a clear space around it to permit freedom of movement of the tank, and also to permit any excess or backset of the skimmed milk to pass freely through the orifice I out of or into the chamber H about the nozzle 44. The construction is such that the valve 43 is open when the valve 33 is closed and reversely when the valve 43 is closed the valve 33 is open. A gravity-latch 47, pivoted at one extremity to a bracket secured to the case, is adapted to catch the extremity of the lever 42 when the valve 43 is seated and when the valve 33 is open, and releasably lock the parts in position. A rod 48, secured to one arm of the tilting bottom 31, extends to and terminates immediately beneath the latch 47, and when the bottom 31 is tilted by the ball-weight falling thereon the rod pushes against and lifts the latch 47 out of engagement with the lever 42, which is immediately shifted by the action of the weight 34' closing the valve 33 and opening the valve 43. A bracket 49, secured to the side of the chamber H and so formed as to have a vertical way therein, serves as a guide for the vertical movement of the free extremity of the latch 47. A finger 50, secured to and projecting downwardly from the steelyard 17, is adapted to contact with and force the latch 47 down into engagement with the lever 42, if it should fail to act by gravity.

To enable the farmer or dairyman to obtain his supply of skimmed milk through this machine, he places the weight-balls he has received in the trough or runway E, which being downwardly inclined permits them to run down toward and, when permitted, into the scoop or pocket 27; but for admitting these weight-balls successively to the weight-pocket 27 suitably, for the purposes of this machine, other locking and releasing mechanism is required as follows: The handle draw-bar F, which projects through the case A and through the wall of the creamery, is mounted reciprocally in brackets therefor fixed on the top of the chamber H. An arm 51, fixed to the draw-bar F, (and braced thereto by the strap 51',) is provided at its lower end with a sliding gate 52, which is adapted to close the inner end of the trough E and prevent the discharge of a ball-weight therefrom into the pocket 27 except when the gate is withdrawn laterally, permitting a ball to pass freely from the trough or runway into the pocket. A gravity-actuated latch 53, pivoted medially on the side of the chamber H, takes into a notch in the lower edge of the draw-bar F, and prevents its being withdrawn, to permit a ball-weight to pass into the socket 27, except when this latch 53 is released. For accomplishing this a rod 54 connects the latch 53 with the inner crank-arm of a little rock-shaft 55, mounted in brackets fixed on the case, which rock-shaft is provided with another (outer) crank-arm 56, the free extremity of which in normal position and as actuated by the gravity-latch 53 comes up through a transverse slot in the runway E near the gate 52. The construction is such that a ball-weight passing down the runway E to and against the gate 52 lies on and depresses the crank-arm 56, thus tripping the latch 53 and releasing the draw-bar F, so that it can be drawn outwardly, shifting the gate 52 from in front of the ball-weight runway, and allowing the ball to fall into the pocket 27. As the farmer or dairyman may put several of these ball-weights into the runway E at the same time, and as only one ball must be permitted to come to the gate 52 until that ball shall have been discharged into the pocket 27, a small auxiliary or primary gate 57 is pivoted in a bracket secured to the case, and is provided with a contractile spring 58, which normally and yieldingly holds the gate through a slot in the runway E at a little distance in front of the arm 56, and in such position in the trough or runway as to cut off or hold back all of the ball-weights except the one between it and the gate 52 until that first ball-weight shall have been discharged into the pocket 27. A finger 59, fixed on the arm 51, extends over and loosely engages a projection on the stem of the swinging gate 57 and tilts it downwardly and out of the runway E when the gate 52 is closed, but releases it, allowing it under the action of the spring 58 to enter the runway and hold back the ball-weights when the gate 52 is withdrawn from in front thereof. A contractile spring 60, secured to the arm 51 and to the case, is adapted automatically to retrieve the draw-bar F and close the gate 52 and open the primary gate 57. Pins 61 61, fixed in and projecting from the draw-bar F, one at each side of a bracket-guide therefor, prevent undue movement of the draw-bar in either direction.

That the farmer or dairyman may, after he has placed the ball-weights in the trough or runway E, be able to open the valve 33 and close the valve 43 until the tank 10 shall have been supplied with the proportionate amount of skimmed milk, and also to provide for the closing of the valve 33 and the opening of the valve 43 when the tank shall have been so supplied, and independently of the control of the farmer or dairyman, a gravity-actuated finger or block 62, pivoted medially on the end of the chamber H, is so mounted that the depending bob or weight throws the finger up in front of a lug 63 on the draw-bar and behind the extremity of the lever 42, so that as the draw-bar F is withdrawn the lug 63 will at the proper time engage the finger 62 and force it against the lever 42, which will thereby, by the continued movement of the draw-bar outwardly, be shifted so far as to open the valve 33 and close the valve 43, and at the same time to be brought under and engaged by the latch 47, whereupon, and practically at about the same time, by the further movement of the draw-bar F, the finger 62 will pass below the lug 63, and will thereby escape therefrom when the finger will assume its upright position at the rear of the lug 63, and the draw-bar 64, when retrieved by the spring 60, will by reason of the reverse tilting of the finger pass back rearwardly over it to its initial position. (Shown in Fig. 4.)

A pin 65, inserted in the end wall of the chamber H, serves as a stop to prevent the undue tilting of the gravity-actuated finger 62. The head of a bolt 66, secured adjustably in an upwardly-disposed slot in a bracket 67, serves as a stop to prevent undue tilting of the lever 23. The bracket 67 is secured to the case and to the end wall of the chamber H, which serves for a strengthening device and for a partition between the end of the runway E and the path of the pocket 27, it being provided with an aperture registering with the end of the runway. The gate 52 also moves alongside this partition or wall. A rod 68, connected at its upper end to the draw-bar F, extends downwardly through a guide 69, fixed in the end wall of the chamber H, and at its lower extremity is adapted to contact with and force down the lever 23 (if it fails to fall by gravity) when the draw-bar is pulled out. The draw-bar is provided with a hinged extension F', which swings down by gravity when not in use, but is a convenient handle for grasping by persons of different heights or in vehicles of different heights for pulling out the draw-bar. A bracket 70, fixed on the end wall of the chamber H, projects upwardly between the furcate arms of the lever 23, just in front of the scoop or pocket 27, and prevents the ball-weight from escaping from the pocket until it is raised high enough by the tilting of the lever 23 to permit the ball to roll over the top of this bracket-wall 70 into the hopper 30.

What we claim as our invention is—

1. The combination with a weight-controlled fulcrumed steelyard, pivoted scale-levers connected to the steelyard and a tank supported on the levers, of a pipe for supplying liquid to and a port for discharging the liquid from the tank, valves for opening and closing the supply-pipe and the discharging-port, devices actuated by the rising and falling of the tank for automatically opening and closing the said valves, and a device for releasably locking the valve-actuating devices, substantially as described.

2. The combination with a weight-controlled fulcrumed steelyard, pivoted scale-levers connected to the steelyard, and a tank supported on the levers, of a pipe for supplying liquid to and a port for discharging the liquid from the tank, a valve in the discharge-port releasably closed by its own gravity and the gravity of the tank-contained material thereon, a valve in the supply-pipe, and means for automatically opening the discharge-valve and for concurrently closing the valve in the supply-pipe and locking it in position, substantially as described.

3. In a liquid-weighing machine, the combination of a fulcrumed steelyard, scale-levers connected at one extremity by a rod or link to an arm of the steelyard, a tank suspended from the scale-levers, a tilting weight-lever an arm of which is connected by a rod or link to an arm of the steelyard, and a scoop or pocket on the weight-lever for a weight, substantially as described.

4. In a liquid-weighing machine, the combination of a fulcrumed steelyard, scale-levers connected at one extremity by a rod or link to an arm of the steelyard, a tank suspended from the scale-lever, a tilting weight-lever one arm of which is connected by a rod or link to an arm of the steelyard, said weight-lever being provided with a scoop or pocket for receiving a weight, and an adjustable counterpoise on the other arm of the weight-lever, substantially as described.

5. In a liquid-weighing machine, the combination of a fulcrumed steelyard, scale-levers connected at one extremity by a rod or link to an arm of the steelyard, a tank suspended from the scale-levers, a tilting weight-lever, a graduated plate adjustable on the weight-lever, a rod connecting the plate to an arm of the steelyard, and a pocket on the weight-lever for a weight, substantially as described.

6. In a liquid-weighing machine, the combination with a fulcrumed steelyard, pivoted scale-levers connected to the steelyard and a material-holder suspended on the scale-levers, of a pivoted weight-lever provided with a weight-pocket and connected to the steelyard, and a trough or runway for ball-weights so disposed as to discharge into the pocket, substantially as described.

7. In a liquid-weighing machine, the combination with a steelyard carrying on one arm the material-holding device, of a tiltable weight lever or arm provided with a weight-pocket, a runway for ball-weights disposed to discharge into the pocket, and a shiftable gate adapted to close the discharge of the runway into the pocket, substantially as described.

8. In a liquid-weighing machine, the combination with a steelyard carrying on one arm the material-holding device, of a tiltable weight lever or arm provided with a weight-pocket, a runway for ball-weights disposed to discharge into the pocket, a shiftable gate adapted to close the runway into the pocket, an auxiliary or primary gate adapted normally to close the runway at a little distance in front of said shiftable gate and means for opening the auxiliary gate when the shiftable or principal gate is closed, substantially as described.

9. In a liquid-weighing machine, the combination with a steelyard carrying on one arm the material-holding device, of a tiltable weight lever or arm provided with a weight-pocket, a runway for ball-weights disposed to discharge into the pocket, a shiftable gate adapted to close the discharge of the runway into the pocket, a draw-bar on which the shiftable gate is rigidly mounted, an automatic latch adapted to lock the draw-bar when the gate is closed, a rock-shaft connected through its crank-arm and a rod to the latch, and another crank-arm on the rock-shaft adapted normally to lie in the path of a ball-weight near to and in front of the slidable gate and to be depressed by the weight, substantially as described.

10. In a liquid-weighing machine, the combination of a steelyard, a tilting weight-arm connected to the steelyard, a shiftable gate for admitting a weight onto the weight-arm, a draw-bar on which the gate is rigidly mounted, and a rod 69 connected to and actuated by the draw-bar adapted to contact with the weight-arm and force it to position to receive a weight from the gate-aperture, substantially as described.

11. In a liquid-weighing machine, the combination with a material-holding tank supported on scale-levers, of a supply-pipe arranged to discharge into the tank, a self-closing valve in the supply-pipe, a lever 35 arranged to lift the valve from its seat, a swinging arm 38 arranged to tilt the lever, a finger rigid on the swinging arm, and a shifting lever 42 connected to the finger and adapted when shifted therefor to open said valve, substantially as described.

12. In a liquid-weighing machine, the combination with a material-holding tank supported on scale-levers, of a supply-pipe arranged to discharge into the tank, a self-closing valve in the supply-pipe, a lever 35 arranged to lift the valve from its seat, a self-closing valve hung on the other arm of said lever said valve being adapted to close the discharge-port in the tank when the supply-pipe is open, a swinging arm 38 arranged to tilt the lever, a finger rigid on the swinging arm, and a shifting lever 42 connected to the finger and adapted when shifted therefor to open said valve, substantially as described.

13. In a liquid-weighing machine, the combination of a valve-shifting lever 42, a self-engaging latch 47, a tiltable hopper-bottom 31 and a push-rod 48 attached to the hopper-bottom and adapted when the bottom is tilted to lift the latch out of engagement with the shifting lever, substantially as described.

14. In a liquid-weighing machine, the combination of a supply-pipe, a weight-loaded valve in the supply-pipe, a shifting lever 42 connected operatively to and adapted to open the valve, a gravity-latch 47 adapted to engage the lever and hold the valve open, and a tripable hopper-bottom 31 provided with a rod adapted to lift the latch and permit the weight-loaded valve to close and shift the lever, substantially as described.

15. The combination of the shifting lever 42, the draw-bar F, and the gravity-actuated finger 62 interposed between a lug on the draw-bar and an arm of the shifting lever and so as to engage the lug on the draw-bar when moved in one direction and under continuous movement to pass it, and to pass it freely in the other direction, substantially as described.

16. The combination of the steelyard, the finger 50, thereon, the tilting weight-arm 23 connected by a rod to the steelyard, and having a weight-pocket, the tiltable bottom 31 having a push-rod 48 and the pivoted latch 47, actuated by said push-rod and said finger substantially as described.

17. The combination in a machine of the character described of a weight-runway, a draw-bar F, a principal gate 52 mounted rigidly thereon adapted normally to close the runway, an auxiliary gate 57 adapted temporarily to close the runway to the principal gate and to be withdrawn by the retrieving of the bar, and a spring 60 adapted to retrieve the bar, substantially as described.

18. In a liquid-weighing machine, the combination of an uptilting weight-lever, a weight-pocket on one arm of the lever, and a fixed wall or guard 70 at the inner end of the pocket adapted to retain the weight in the pocket until the pocket is raised above the wall or guard, substantially as described.

19. In a weighing-machine, the combination with an uptilting weight-lever having a weight-pocket, of a fixed guard-wall at the inner end of the pocket adapted to retain the weight in the pocket when the pocket is in its lower position and to allow the weight to escape therefrom over the wall when the pocket is in its higher position, a weight-receiving hopper at the rear of the guard-wall, and a tiltable weight-actuated bottom in the hopper, substantially as described.

In testimony whereof we affix our signatures in presence of two witnesses.

CHARLES S. BROWN.
WILLIAM E. PENN.

Witnesses:
A. W. GREENWOOD,
C. F. GREENWOOD.